Patented Jan. 16, 1951

2,538,322

UNITED STATES PATENT OFFICE 2,538,322

5 - ALPHA - CYCLOPROPYLETHYL SUBSTITUTED BARBITURIC ACIDS AND PROCESS FOR PREPARING SAME

Joseph W. Opie, Minneapolis, Minn., and Joseph Seifter, Willow Grove, William F. Bruce, Havertown, and George Mueller, Philadelphia, Pa., assignors to Wyeth Incorporated, Philadelphia, Pa., a corporation of Delaware No Drawing. Application December 21, 1946, Serial No. 717,806

10 Claims. (Cl. 260—257)

This invention relates to new barbituric and thiobarbituric acid derivatives and methods for preparing them. More particularly, the invention relates to methods for preparing barbituric and thiobarbituric acid derivatives having an alpha-cyclopropylethyl radical and an alkyl, alicyclic, alicyclicalkyl or alkenyl radical attached to the 5-carbon atom of the barbituric or thiobarbituric ring; and to specific barbituric and thiobarbituric compounds.

The compounds made in accordance with the disclosed methods may be represented by the structural formula:

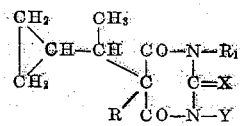

where R is an alkyl radical of 2 to 5 carbon atoms, an alicyclic radical of 3 to 5 carbon atoms, an alicyclicalkyl radical of 4 to 5 carbon atoms, or an alkenyl radical having 3 to 5 carbon atoms, $R_1$ is H or an alkyl radical of 1 to 2 carbon atoms, X represents O or S and Y represents a member of the group consisting of hydrogen, an alkali metal, an alkaline earth metal, ammonium, or in fact, any salt of an organic base such as alkyl ammonium or dialkyl ammonium.

Cyclopropyl barbiturates falling within the scope of the invention are useful pharmacologically as anesthetics, sedatives, anticonvulsants, soporifics and hypnotics, displaying a relatively fast action of comparative short duration which properties render the new compounds suitable for specific therapeutic purposes.

In accordance with the present invention, the new barbituric or thiobarbituric acids are obtainable by condensing methyl cyclopropyl ketone with cyanoacetamide, malononitrile or ethyl cyanoacetate to form a mixture of cis and trans forms of the alpha cyclopropyl ethylidenecyanoacetamide, -malononitrile or -ethylcyanoacetate. The condensation product is reduced with hydrogen and a catalyst to form a mixture of the diastereoisomers of alpha-cyclopropylethyl ethylcyanoacetamide, ethylmalononitrile or ethylcyanoacetate. The product is alkylated with a dialkyl sulphate or an alkyl, alicyclic, alicyclicalkyl or alkenyl halide to form the corresponding alkylated compound which is then condensed with urea, guanidine, thiourea or the mono-N-alkylated derivatives of these, or, in the case of the alkylated alpha-cyclopropyl ethylcyanoacetamide or the ethylmalononitrile, these compounds may first be hydrolyzed and then esterified prior to the condensation step. In any case, the condensation product is finally hydrolyzed to form the 5-alpha-cyclopropylethyl-5-alkyl, -alicyclic, -alicyclicalkyl or -alkenyl barbituric or thiobarbituric acid derivatives.

The invention is further illustrated by the following examples.

EXAMPLE I

*Preparation of alpha-cyclopropylethylidene ethyl cyanoacetate*

To a mixture of 1130 g. of ethylcyanoacetate, 840 g. of methylcyclopropyl ketone and 1000 cc. of benzene, there was added 77 g. of ammonium acetate (moist) and 120 g. of glacial acetic acid. The mixture was refluxed for 32 hours, or until no more water distilled over with the benzene, the water layer being removed from a water separator. The total water removed was 201 cc. After completion of the reaction approximately 300 cc. of ether was added and the solution washed twice with 100 g. of sodium chloride in 1600 cc. of water. The benzene layer was separated; filtered through sodium sulfate, and the benzene distilled off in vacuo. The product was refrigerated and the crystalline product separated from oil by filtration. The filtrate was dissolved in hot alcohol, chilled and a further amount of the crystalline isomer was obtained by filtration. The alcohol was removed by distillation from the latter filtrate. The residue was distilled in vacuo (119°–120° C. at 2 mm.)

giving a mixture of the crystalline and liquid isomers. The total yield of the two geometric isomers of alpha-cyclopropylethylidene ethylcyanoacetate was 1449 g. (81%). The crystalline isomer may be recrystallized from ethyl alcohol. The pure crystals had a melting point of 81–82° C.

ANALYSIS

Calc'd for $C_{10}H_{13}NO_2$: C, 67.03  H, 7.26  N, 7.82
Found:                       C, 66.99  H, 7.34  N, 7.79

EXAMPLE II

Condensation of methylcyclopropyl ketone with cyanoacetamide

A mixture of 168 g. (2 moles) methyl cyclopropyl ketone, 168 g. (2 moles) cyanoacetamide, 15.4 g. moist ammonium acetate, 24 cc. glacial acetic acid and 200 cc. of benzene was refluxed for 6 hours using a water separator. At this time 37.5 cc. of water was collected. The hot benzene solution was poured into a crystallizing dish and allowed to come to room temperature; the crystalline solid which formed was filtered off, washed with benzene and water and was air dried. The product melted at 98–100° and weighed 221 g. or 73.5 g. or 73.5%. A 10 g. portion was recrystallized from hot water and treated with carbon yielding material melting at 116–124°. Recrystallization from hot ethanol gave material melting at 166–167°. Further recrystallization from benzene did not raise the melting point.

ANALYSIS

Calc'd for $C_8H_{10}N_2O$: C, 64.00  H, 6.66  N, 18.66
Found:                    C, 64.20  H, 7.08  N, 18.89

EXAMPLE III

Condensation of methylcyclopropyl ketone with malononitrile

Malononitrile, 76 g. (1.15 moles), methylcyclopropyl ketone, 109 g. (1.3 moles), 3 g. of wet ammonium acetate crystals, 12 cc. of glacial acetic acid and 100 cc. of benzene were heated during 4.5 hours; 29 cc. of aqueous phase collected in a water collector attached beneath the reflux condenser. The cooled mixture was diluted with an equal volume of ether, washed 4 times with an equal volume of water each time and concentrated in vacuo. The yield of crude concentrate was 100%. The material was distilled, B. P. 135–137°/6 mm.; yield 141 g. (93%). The product was a solid crystallizing in the receiver. When recrystallized from aqueous methanol or ethanol elongated colorless plates, M. P. 65.5–66.6°, were obtained.

ANALYSIS

Calc'd for $C_8H_8N_2$: C, 72.70  H, 6.10  N, 21.20
Found:                 C, 72.81  H, 5.98  N, 21.44

EXAMPLE IV

Preparation of alpha-cyclopropylethyl-cyanoacetic acid ethyl ester

The solid isomer (71 g.; 0.4 m.) as prepared in Example I was suspended in alcohol (absolute, 75 cc.). Palladium on charcoal catalyst (5% Pd; 1 g.) was added to the solution, and the mixture was shaken with hydrogen at 31 p. s. i. until a total pressure drop of 31 pounds had occurred. This indicates the addition of 1 mole of hydrogen. The catalyst was filtered off. The alcohol was removed in vacuo, and the residue was vacuum distilled. The product boiled at 89–90° C./2 mm. and weighed 52 g. (72% yield). The index of refraction $n_D^{20}$ of the product was 1.4569. The above reduction was repeated using the liquid isomer prepared in Example I. The product obtained had substantially the same boiling range and refractive index as the product from the solid isomer.

ANALYSIS

Calc'd for $C_{10}H_{15}NO_2$: C, 66.29  H, 8.28  N, 7.73
Found:                       C, 66.32  H, 8.29  N, 7.47

In place of the palladium on charcoal catalyst, Raney nickel catalyst activated with one quarter of its weight of 5% palladium on charcoal may be used as the hydrogenation catalyst.

EXAMPLE V

Preparation #1 of alpha'-(alpha-cyclopropylethyl)-alpha'-ethyl cyanoacetic acid ethyl ester The hydrogenated cyano ester prepared in accordance with Example IV (46 g., 0.25 m.) was added to a cold solution of sodium (6 g.) in absolute isopropanol (200 cc.). The mixture was stirred for a few minutes during which period it became dark orange in color. Diethyl-sulfate (39 g.; 0.25 m.) was added all at one time and the solution was heated to boiling. An exothermic reaction took place lasting for about 30 minutes during which time external heating was discontinued. At the end of this period, the orange color had disappeared and the solution was neutral to moist indicator paper. A heavy precipitate of sodium sulfate was suspended in the solution at this point. The mixture was poured over ice, and the aqueous suspension was extracted with 3×200 cc. of benzene. The benzene extract was washed with water, filtered, dried over sodium sulfate, filtered again and then concentrated in vacuo. The residue which remained when all of the benzene had been removed was vacuum distilled. The material boiling up to 63° C. at 2 mm. was discarded. The remainder of the distillate was redistilled and a product boiling between 90–94° C. at 2 mm. was obtained in good yield. The refractive index $n_D^{20}$ was 1.4445.

ANALYSIS

Calc'd for $C_{12}H_{19}NO_2$: C, 68.86  H, 9.15  N, 6.69
Found:                       C, 68.66  H, 9.22  N, 6.72

EXAMPLE VI

Preparation #2 of alpha'-(alpha-cyclopropylethyl)-alpha'-ethyl cyanoacetic acid ethyl ester Clean sodium metal (0.535 mole) was dissolved in 200 cc. of absolute alcohol. Most of the alcohol was removed in vacuo from this solution and a solution of 0.535 mole of ethyl-alpha-cyclopropylethyl-cyanoacetate in 300 g. of diethyl carbonate was added. All the alcohol was distilled from this solution while heating and stirring. Ethyl bromide, 0.65 mole, was added; the mixture heated one hour, then 10 g. more of ethyl bromide added and heating continued 4.5 hours. After standing 21 hours, the mixture was worked up with water and ether. It was not acid to phenolphthalein. The solvents were removed and the product distilled. The product was collected between 95.1°–98.2° C. at 2.9 mm.; $n_D^{22}$ 1.4406.

EXAMPLE VII

*Preparation #3 of alpha'-(alpha-cyclopropylethyl)-alpha'-ethyl cyanoacetic acid ethyl ester*

Clean sodium metal (0.50 moles) was added to 300 cc. of absolute ethanol; just before dissolution was complete and while the solution was at 60,° 105 g. (0.58 mole) of ethyl-alpha-cyclopropylethyl-cyanoacetate was introduced quickly and within five minutes of completing this addition, 71 g. (0.65 mole) of ethyl bromide was added rapidly. Within five minutes, sodium bromide began to precipitate and the temperature rose to reflux temperature where it remained during an hour. External heating was then applied and the mixture heated at slow reflux with stirring for 23 hours, after which 180 cc. of alcohol was distilled off. The cooled mixture was then poured into water and extracted with ether, the ether extract dried and distilled. The product was collected between 95.1–99.0° C. at 2.9 mm.; $n_D^{22}$ 1.4445.

EXAMPLE VIII

*Preparation #4 of alpha'-(alpha-cyclopropylethyl)-alpha'-ethyl cyanoacetic acid ethyl ester*

Sodium metal (0.527 mole) was powdered under mineral oil, washed with dry ether and placed under 250 cc. of diethyl carbonate. Ethyl-alpha-cyclopropylethyl-cyanoacetate (0.61 mole), was added slowly to the cooled, stirred solution. After the sodium had dissolved, 71 g. (0.65 mole) of ethyl bromide was added and the mixture heated 20 hours at 75–80° C. with stirring, after which an additional amount of 10 g. of ethyl bromide was added and heating continued for 4 hours. The cooled solution was worked up with water and ether, and the ethereal solution dried and distilled in vacuo. The product was collected between 96.0°–98.0° C. at 2.9 mm.; $n_D^{22}$ 1.4413.

While these examples illustrate the preparation of the ethyl derivative, the corresponding alicyclic or alicyclicalkyl derivatives may be prepared in the same way using the corresponding halide in place of ethyl bromide. In the same way, the corresponding alkenyl derivative may be prepared by using an alkenyl halide, as for example, allyl bromide in place of ethyl bromide.

EXAMPLE IX

*Preparation of 5-alpha-cyclopropylethyl-5-ethyl barbituric acid*

Sodium (16.7 g., 0.725 m.) was dissolved in alcohol (250 cc.). Urea (21.75 g., 0.36 m.) was added to this hot solution, and the alkylation product (66.7 g., 0.29 m.) was then added. The mixture was refluxed at 80–100° C. for 48 hours. The alcohol was distilled from this solution under vacuum, and the residue was dissolved in 200 cc. of water. This solution was extracted twice with ether, which was discarded. The aqueous solution was made acid and then diluted with an equivalent volume of concentrated hydrochloric acid. This solution was refluxed for fourteen hours. It was then chilled and extracted with ether. The ether was evaporated, and the residue was dissolved in 10% sodium hydroxide. This solution was boiled with charcoal, filtered and acidified. The solution was extracted with ether. The ether was evaporated, and the residue was dissolved in absolute ether. The barbituric acid derivative was precipitated from this solution with petroleum ether. The product melted at 149–152° C. Upon crystallization from ether-petroleum ether, it melted at 162–163° C.

ANALYSIS

Calc'd for $C_{11}H_{16}N_2O_3$: C, 58.92   H, 7.14   N, 12.50
Found:                        C, 59.06   H, 7.20   N, 12.65

While urea has been used in the above condensation, similar results may be obtained using guanidine.

The thiobarbituric acid derivative corresponding to the barbituric acid derivative of Example IX can be obtained by a similar condensation as outlined above, by using thiourea in place of urea or guanidine. Likewise, the mono-N-alkylated barbituric and thiobarbituric acids may be obtained by using the corresponding alkylated derivative of urea, guanidine or thiourea.

EXAMPLE X

*Preparation of the salts of barbituric and thiobarbituric acid*

The salts of the new barbituric and thiobarbituric acid derivatives are obtained by neutralizing with bases in the well-known manner, as for example with alkali metal hydroxide or alcoholate, alkaline earth metal hydroxide or alcoholate, an aqueous or alcoholic solution of concentrated ammonia or with an alkyl amine such as methyl or ethyl amine or with a dialkyl amine such as dimethyl or diethylamine. The following procedures illustrate the formation of typical water-soluble salts.

Sodium salt: To the solid, water-insoluble 5-alpha-cyclopropylethyl-5-ethyl barbituric acid, 0.0223 g. (0.0001 mole), the addition of 0.4 cc. of a solution containing 0.00025 mole/cc. of sodium hydroxide in 95% ethanol gave a clear solution of the sodium barbiturate. Addition of 10–15 cc. of anhydrous ether precipitated the salt which was separated by centrifuging, washed with anhydrous ether, separated and dried. The salt was water-soluble.

Magnesium salt: The solid barbiturate, 0.1115 g. (0.0005 mole) readily dissolved in 1.0 cc. of methanol containing 0.0005 mole/cc. of magnesium. The salt was precipitated and washed with dry ether as in the preparation of the sodium salt. The addition of 0.00025 mole of an alkaline earth metal methylate to 0.0005 mole of the barbiturate precipitated only the equivalent of an alkaline earth metal salt (hydroxyalkaline earth metal salt) which was also water-soluble.

In the same way, one molar proportion of any of the above-described 5,5-disubstituted barbituric or thiobarbituric acid derivatives is added to about one molar proportion of an aqueous or alcoholic solution of concentrated ammonia or an alkyl or dialkyl amine. The resulting salt is separated, washed and dried.

The new compounds display marked pharmacological action. Tables I and II disclose comparative tests carried out on mice and rabbits using 5-alpha-cyclopropylethyl-5-ethyl barbituric acid compared to various well-known barbituric acid compounds. In carrying out these tests, Table I illustrates determinations on mice while Table II illustrates determinations by intravenous injection on rabbits. The term $LD_{50}$ is defined as the dosage, required to kill 50% of the animals, determined by intraperitoneal injections; the term $MHD_{50}$ is defined as the minimum dosage that causes 50% or more of the animals to tolerate the side position for at least 5 minutes; and the term MHD is defined as the minimum dosage that causes all of the animals to tolerate the side position for at least 5 minutes.

TABLE I

*Comparative action of various barbiturates in mice*

| Sodium 5,5-Disubstituted Barbiturate | $LD_{50}$ in mg./kg. | $MHD_{50}$ in mg./kg. | Average Onset at $MHD_{50}$ in min. | Average Duration at $MHD_{50}$ in min. |
|---|---|---|---|---|
| 1. Diethyl | 611 | 135 | 52 | 91 |
| 2. Phenyl-ethyl | 199.6 | 86 | 52 | 187 |
| 3. Ethyl-isopropyl | | 58 | 39 | 129 |
| 4. Ethyl-(1-methyl-1-butenyl) | | 53 | 20 | 21 |
| 5. Allyl-isopropyl | | 37 | 38 | 58 |
| 6. Ethyl-1-methylbutyl | 119.6 | 28 | 12 | 25 |
| 7. Allyl-1-methylbutyl | | 36 | 10 | 34 |
| 8. Ethyl-alpha-cyclopropylethyl | 138.5 | 24 | 12 | 27 |

The data in Table I indicates that the tested compound of the invention when compared with other well-known barbiturates is well tolerated and relatively non-toxic, disclosing a relatively fast action for a short duration and is effective in relatively small dosage.

TABLE II

*Comparative action of various barbiturates in rabbits*

| Sodium 5,5-Disubstituted Barbiturate | MHD, mg./kg. | Average Onset at MHD, min. | Average Duration at MHD, min. |
|---|---|---|---|
| 1. Diethyl | 110 | 43 | 133 |
| 2. Phenyl-ethyl | 70 | 19 | 135 |
| 3. Ethyl-isopropyl | 40 | 16 | 28 |
| 4. Ethyl-(1-methyl-1-butenyl) | 20 | 11 | 24 |
| 5. Allyl-isopropyl | 28 | 13 | 50 |
| 6. Ethyl-1-methylbutyl | 15 | 6 | 32 |
| 7. Allyl-1-methylbutyl | 13 | 2 | 19 |
| 8. Ethyl-alpha-cyclopropylethyl | 18 | 8 | 79 |

The data in Table II carried out with rabbits disclosed substantially the same effects as in Table I when testing with mice. It is clear that a relatively fast action is obtained with a relatively small dosage. It is to be noted however, that the average duration while relatively short as compared to compounds 1 and 2 was quite long as compared to compounds 3–7. Since all of the rabbits reciving the new compound recovered, it is clear that this new barbiturate is non-toxic and well tolerated.

We claim:

1. A barbituric compound represented by the following formula

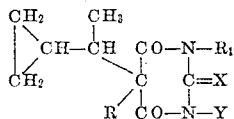

in which R represents a member selected from the group consisting of an alkyl radical of 2 to 5 carbon atoms, an alicyclic radical of 3 to 5 carbon atoms, and an alicyclicalkyl radical of 4 to 5 carbon atoms; $R_1$ represents a member selected from the group consisting of hydrogen and an alkyl of 1 to 2 carbon atoms; X represents a member selected from the group consisting of O and S; and Y represents a member selected from the group consisting of hydrogen, an alkali metal, an alkaline earth metal, ammonim, alkylammonium and dialkylammonium.

2. A barbituric compound represented by the formula:

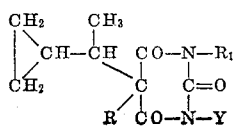

in which R represents a member selected from the group consisting of an alkyl radical of 2 to 5 carbon atoms, an alicyclic radical of 3 to 5 carbon atoms, and an alicyclicalkyl radical of 4 to 5 carbon atoms; $R_1$ represents a member selected from the group consisting of hydrogen and an alkyl of 1 to 2 carbon atoms and Y represents a member selected from the group consisting of hydrogen, an alkali metal, an alkaline earth metal, ammonium, alkylammonium and dialkylammonium.

3. A barbituric compound represented by the formula:

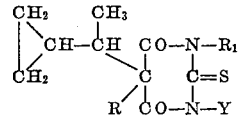

in which R represents a member selected from the group consisting of an alkyl radical of 2 to 5 carbon atoms, an alicyclic radical of 3 to 5 carbon atoms, and an alicyclicalkyl radical of 4 to 5 carbon atoms; $R_1$ represents a member selected from the group consisting of hydrogen and an alkyl of 1 to 2 carbon atoms and Y represents a member selected from the group consisting of hydrogen, an alkali metal, an alkaline earth metal, ammonium, alkylammonium and dialkylammonium.

4. A barbituric compound represented by the formula:

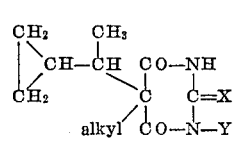

in which the representation alkyl in the formula stands for an alkyl radical having 2 to 5 carbon atoms, and in which X represents a member selected from the group consisting of O and S; Y represents a member selected from the group consisting of hydrogen, an alkali metal, an alkaline earth metal, ammonium, alkylammonium and dialkylammonium.

5. A barbituric compound represented by the formula:

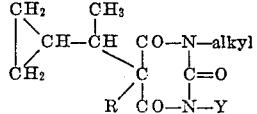

in which R is a member selected from the group consisting of an alkyl radical of 2 to 5 carbon atoms, an alicyclic radical of 3 to 5 carbon atoms, and an alicyclicalkyl radical of 4 to 5 carbon atoms; Y represents a member selected from the group consisting of hydrogen, an alkali metal, an alkaline earth metal, ammonium, alkylammonium and dialkylammonium.

6. A barbituric compound represented by the formula:

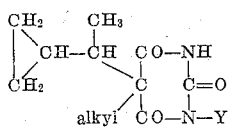

in which the representation alkyl in the formula stands for an alkyl radical having 2 to 5 carbon atoms, and in which Y represents a member selected from the group consisting of hydrogen, an alkali metal, an alkaline earth metal, ammonium, alkylammonium and dialkylammonium.

7. A barbituric compound represented by the formula:

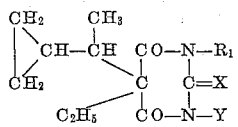

in which $R_1$ represents a member selected from the group consisting of hydrogen and an alkyl having 1 to 2 carbon atoms; X represents a member selected from the group consisting of O and S; and Y represents a member selected from the group consisting of hydrogen, an alkali metal, an alkaline earth metal, ammonium, alkylammonium and dialkylammonium.

8. Sodium 5-alpha-cyclopropylethyl-5-ethyl-barbiturate.

9. Sodium 5-alpha-cyclopropylethyl-5-ethyl thio-barbiturate.

10. In the process of preparing a 5-alicyclic-alkyl-5-ethyl-barbituric acid, the steps comprising condensing an alicyclicalkyl ketone with ethylcyanoacetate, hydrogenating the product so that approximately 1 mol of hydrogen is absorbed to form alicyclialkyl-ethylcyanoacetate and then alkylating the hydrogenated product.

JOSEPH W. OPIE.
JOSEPH SEIFTER.
WILLIAM F. BRUCE.
GEORGE MUELLER.

REFERENCES CITED

The following references are of record in the file of this patent:

UNITED STATES PATENTS

| Number | Name | Date |
|---|---|---|
| 2,019,936 | Shonle | Nov. 5, 1935 |
| 2,150,154 | Cope | Mar. 14, 1939 |
| 2,176,018 | Cope | Oct. 10, 1939 |

OTHER REFERENCES

Chemical Abstracts 32, 2912$^3$ (1938).